US006944877B1

(12) United States Patent
Lord et al.

(10) Patent No.: US 6,944,877 B1
(45) Date of Patent: Sep. 13, 2005

(54) CLOSED LOOP ADDRESSABLE ADVERTISING SYSTEM AND METHOD OF OPERATION

(75) Inventors: William Palmer Lord, Fishkill, NY (US); Nicholas Joseph Mankovich, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 989 days.

(21) Appl. No.: 09/606,400

(22) Filed: Jun. 29, 2000

Related U.S. Application Data

(60) Provisional application No. 60/151,037, filed on Aug. 27, 1999.

(51) Int. Cl.[7] .............................................. H04N 7/25
(52) U.S. Cl. ........................... 725/32; 725/34; 725/38; 725/42; 725/139
(58) Field of Search .............................. 725/32, 34, 35, 725/42, 50, 38, 136, 131, 139, 151

(56) References Cited

U.S. PATENT DOCUMENTS

| | | | |
|---|---|---|---|
| 5,515,098 A | 5/1996 | Carles | 348/8 |
| 5,652,615 A | 7/1997 | Bryant et al. | 348/9 |
| 5,661,516 A | 8/1997 | Carles | 348/8 |
| 5,774,170 A | 6/1998 | Hite et al. | 348/9 |
| 5,892,535 A * | 4/1999 | Allen et al. | 725/36 |
| 6,002,393 A * | 12/1999 | Hite et al. | 725/34 |
| 6,029,045 A * | 2/2000 | Picco et al. | 725/34 |
| 6,177,931 B1 * | 1/2001 | Alexander et al. | 725/52 |
| 6,442,755 B1 * | 8/2002 | Lemmons et al. | 725/47 |
| 6,584,153 B1 * | 6/2003 | Gordon et al. | 375/240.13 |
| 6,698,020 B1 * | 2/2004 | Zigmond et al. | 725/34 |
| 6,745,224 B1 * | 6/2004 | D'Souza et al. | 709/202 |
| 2002/0057893 A1 * | 5/2002 | Wood et al. | 386/46 |

FOREIGN PATENT DOCUMENTS

| | | |
|---|---|---|
| WO | 9826577 A2 | 6/1998 |
| WO | 9828906 A2 | 7/1998 |
| WO | 9950775 A1 | 10/1999 |

* cited by examiner

*Primary Examiner*—Krista Bui

(57) ABSTRACT

There is disclosed an addressable advertising system comprising: 1) receiver circuitry for receiving an incoming television signal from an external source, generating a original baseband video signal, and transmitting the original baseband video signal to a display associated with the addressable advertising system; 2) a local storage device coupled to the receiver circuitry for storing a plurality of replacement video advertisements; and 3) an advertisement controller coupled to the receiver circuitry and the local storage device for detecting a first swap control signal transmitted in the incoming television signal. In response to the detection of the first swap control signal, the advertisement controller causes the receiver circuitry to receive from the local storage device a first selected replacement video advertisement from which the receiver circuitry generates a replacement baseband video signal and transmits the replacement baseband video signal to the display.

22 Claims, 5 Drawing Sheets

CLOSED LOOP ADDRESSABLE ADVERTISING SYSTEM AND METHOD OF OPERATION

This application claims priority under 35 U.S.C. §119(e) to U.S. Provisional Patent Application No. 60/151,037 filed Aug. 27, 1999.

TECHNICAL FIELD OF THE INVENTION

The present invention is directed, in general, to television, radio and Internet broadcast systems and, more specifically, to a system for replacing the regular advertisements in a broadcast video signal with audience-specific advertisements.

BACKGROUND OF THE INVENTION

Closed loop addressable advertising (CLAA) systems are known that replace an original commercial advertisement in a broadcast television signal with a substitute commercial advertisement. The substitute commercial is targeted to a specific segment of the population that is likely to find the substitute commercial more effective than the original or other potential substitute commercial advertisement. This enables the operator of the video broadcast system to increase advertising revenues by charging advertisers a higher "per-viewer" rate in order to reach the target audience. Some advertisers can reduce overall advertising costs by directing their ads to smaller audiences, even though the per-viewer cost is higher. Advertisers are willing to do this because they believe the target audience is a better audience. For example, a luxury car dealer may advertise to a wealthier target audience that is able to afford its luxury cars by advertising only in higher income residential areas.

Closed loop addressable advertising (CLAA) systems typically use a set-top box (STB) in the viewer's home to swap the original and substitute commercials advertisements. The set-top box tunes to a user-selected channel and transmits the regular broadcast television signal provided by the cable company to the television set. However, when a commercial break is about to occur in the regular broadcast television signal, the cable company transmits a special-purpose "swap" signal to the set-top box that causes the set-top box to tune to another channel in which audience-specific commercial advertisements are being broadcast. After one or more targeted commercials are played on the viewer's television set, a second swap signal causes the set-top box to tune back to the original regular broadcast television signal.

The closed loop nature of the CLAA system derives from the fact that the set-top box (or some other peripheral device) is used to monitor the viewing habits of the viewer. The viewer information gathered in this manner is transmitted back to the broadcaster in order to allow data mining and other purposes. The information collected is typically remote control data indicating viewer channel selections and time stamps indicating the time spent viewing each channel. The gathered data may then be sold to the advertisers in order to target advertisements better and may be used to modify the viewing habits of the members of the household.

There are, however, drawbacks to the existing CLAA systems. Existing systems are bandwidth limited and one or more of a finite number of channels must be dedicated to the broadcast of the audience-specific commercial advertisements. The more audience-specific commercials that are added and the more groups that are targeted, the more bandwidth that is consumed. This leaves less channels available to carry the basic broadcast television programming.

There is therefore a need in the art for improved closed loop addressable advertising (CLAA) systems. In particular, there is a need for closed loop addressable advertising systems that provide a large number of audience-specific commercial advertisements while consuming only a minimum amount of the available television signal bandwidth.

SUMMARY OF THE INVENTION

To address the above-discussed deficiencies of the prior art, it is a primary object of the present invention to provide an addressable advertising system comprising: 1) receiver circuitry capable of receiving an incoming television signal from an external source or a local recorded source (e.g., VCR, DVD, and the like), generating therefrom a original baseband video signal, and transmitting the original baseband video signal to a display associated with the addressable advertising system; 2) a local storage device coupled to the receiver circuitry capable of storing a plurality of replacement video advertisements; and 3) an advertisement controller coupled to the receiver circuitry and the local storage device capable of detecting a first swap control signal transmitted in the incoming television signal, wherein the advertisement controller, in response to the detection, causes the receiver circuitry to receive from the local storage device a first selected replacement video (or audio or multimedia) advertisement and wherein the receiver circuitry generates therefrom a replacement baseband video signal and transmits the replacement baseband video signal to the display.

According to one embodiment of the present invention, the local storage device comprises at least one of a magnetic fixed disk drive, a digital versatile disk (DVD) drive, and a compact disk (CD) drive.

According to another embodiment of the present invention, the local storage device is coupled to the addressable advertising system via a network connection.

According to still another embodiment of the present invention, the addressable advertising system further comprises a replacement advertisement download controller capable of receiving incoming replacement video advertisements from the external source and storing the incoming replacement video advertisements in the local storage device.

According to yet another embodiment of the present invention, the replacement advertisement download controller comprises an MPEG encoder circuit capable of receiving the incoming television signal and converting a first incoming replacement video advertisement transmitted in a first selected channel to MPEG data capable of being stored in the local storage device.

According to a further embodiment of the present invention, the replacement advertisement download controller comprises a modem capable of receiving from a telephone network a first incoming replacement video advertisement and storing the first incoming replacement video advertisement as MPEG data in the local storage device.

According to a still further embodiment of the present invention, the replacement advertisement download controller receives the incoming replacement video advertisements at a predetermined time according to modifiable download time values stored in a memory associated with the advertisement controller.

According to a yet further embodiment of the present invention, the advertisement controller is further capable of detecting a second swap control signal transmitted in the incoming television signal, wherein the advertisement controller, in response to the detection of the second swap signal, causes the receiver circuitry to transmit the original baseband video signal to the display.

In one embodiment of the present invention, the advertisement controller is further capable of detecting a replacement advertisement selection signal transmitted in the incoming television signal, wherein the replacement advertisement selection signal comprises a data value identifying the first selected replacement video advertisement, and wherein the advertisement controller, in response to the detection of the replacement advertisement selection signal, causes the local storage device to transmit the first selected replacement video advertisement to the receiver circuitry.

In another embodiment of the present invention, the receiver circuitry comprises a vertical blanking interval (VBI) decoder capable of detecting the first swap control signal transmitted during a vertical blanking interval in the incoming television signal.

In still another embodiment of the present invention, the receiver circuitry further comprises a down-converter coupled to the vertical blanking interval decoder and capable of down-converting the incoming television signal to the original baseband video signal.

In yet another embodiment of the present invention, the receiver circuitry further comprises a multiplexer having a first input capable of receiving the original baseband video signal and a second input capable of receiving the replacement baseband video signal, wherein the multiplexer is controlled by the advertisement controller.

In a further embodiment of the present invention, the receiver circuitry comprises a video processor having a first input capable of receiving the incoming television signal and generating therefrom the original baseband video signal and a second input capable of receiving the first selected replacement video advertisement and generating therefrom the replacement baseband video signal.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged closed loop addressable advertising (CLAA) system.

Figure 1:
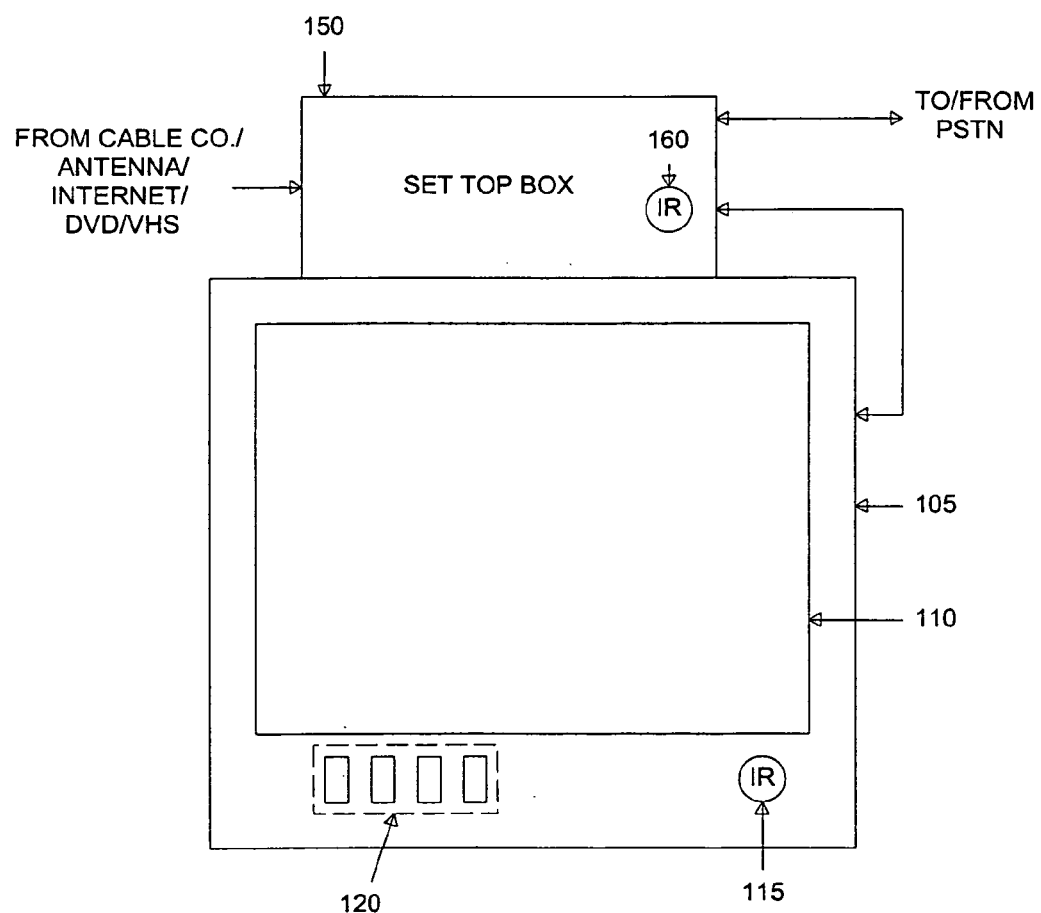
FIG. 1 illustrates an exemplary set-top box and television set according to one embodiment of the present invention.

FIG. 1 illustrates television set 105 and exemplary set-top box 150 according to one embodiment of the present invention. Set-top box 150 receives incoming television signals from an external source, such as a cable television service provider (Cable Co.), a local antenna, the Internet, or a DVD or VHS tape player, and transmits a viewer-selected channel to television set 105. Set-top box 150 comprises infrared (IR) sensor 160 that receives commands (such as channel up, channel down, volume up, volume down) from a remote control device operated by the viewer. Television set 105 is a conventional television comprising screen 110, infrared (IR) sensor 115, and one or more manual controls 120 (indicated by a dotted line). IR sensor 115 also receives commands (such as volume up, volume down, power ON/OFF) from a remote control device operated by the viewer.

As will be described below in greater detail, set-top box 150 detects special purpose signals in the incoming television signals from the cable service provider. Each of the special purpose signals is a "swap" signal associated with a corresponding channel. The swap signal indicates that an original commercial advertisement is about to be shown on screen 110 on the corresponding channel. If the corresponding channel is being viewed by the operator of television 105 (i.e., the viewer selected channel transmitted to television 105), then set-top box 150 replaces the incoming original commercial advertisement with a replacement commercial advertisement that is retrieved from a local storage medium within, or coupled to, set-top box 150. A number of replacement commercial advertisements may be stored on the local storage medium by a variety of different means, as discussed below in greater detail. The viewer's selected channel is monitored even when a replacement advertisement is playing to determine if a subsequent switch is made.

It should be noted that set-top box 150 is not limited to receiving a particular type of incoming television signal from a particular type of source. As noted above, the external source may be a cable service provider, a conventional RF broadcast antenna, a satellite dish, an Internet connection, or a local storage device such as DVD player or a VHS tape player. Therefore, the incoming signal may be a digital signal, an analog signal, or Internet protocol (IP) packets. Furthermore, in some embodiments of the present invention, the incoming signal may be a radio signal, such as a conventional AM or FM broadcast signal, that set-top box 150 transmits to an attached radio receiver. However, for the purposes of simplicity and clarity in explaining the principles of the present invention, the descriptions that follow shall generally be directed to an embodiment in which set-top box 150 receives incoming television signals (analog and/or digital) from a cable service provider. Nonetheless, those skilled in the art will understand that the principles of the present invention may readily be adapted for use with radio signals, wireless broadcast television signals, local storage systems, an incoming stream of IP packets containing MPEG data, a and the like.

Figure 2:
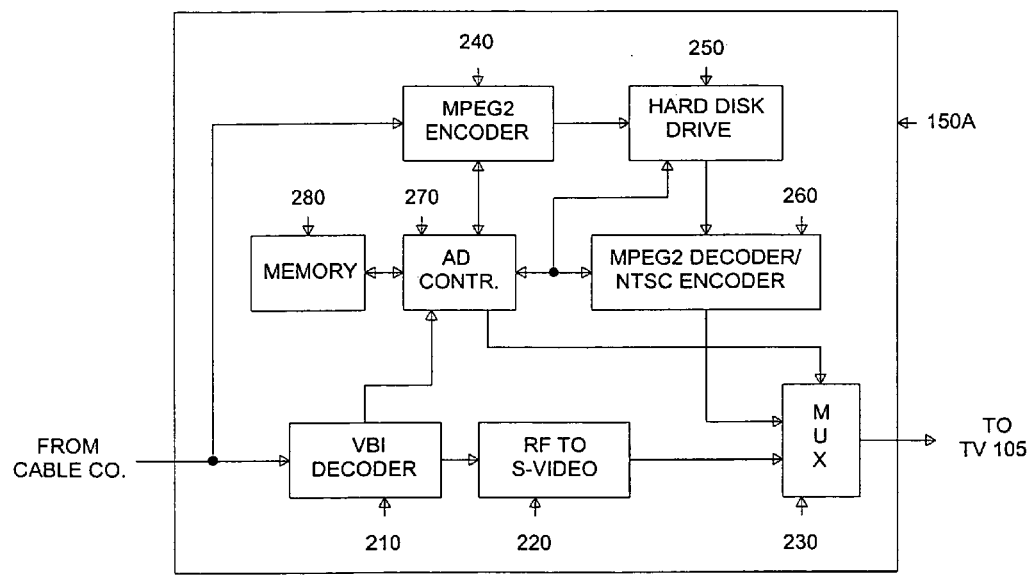
FIG. 2 illustrates in greater detail an exemplary set-top box according to one embodiment of the present invention.

FIG. 2 illustrates in greater detail exemplary set-top box 150A according to a first embodiment of the present invention. Set-top box 150A comprises vertical blanking interval (VBI) decoder 210, RF-to-super video (S-video) converter 220, multiplexer (MUX) 230, MPEG2 encoder 240, and hard disk drive 250. Set-top box 150A also comprises MPEG2 decoder/NTSC encoder 260, advertisement (AD) controller 270, and memory 280. During normal operation (prior to start of an advertisement), VBI decoder 210 detects special purpose "swap" signals in the blanking intervals of the incoming television signals from the cable service provider. VBI decoder 210 then notifies advertisement controller 270 of the receipt of each swap signal and the corresponding channel for each swap signal.

RF-to-super video converter 220 is a tuner/demodulator circuit that converts the channel selected by the viewer from a RF signal to a super video signal that is transmitted to television set 105 via multiplexer 230. Super video is a well-known technology for transmitting video signals over a cable by dividing the video information into two separate signals: one for color (chrominance or C) and one for brightness (luminance or Y). Transmitting the split signal produces sharper images than transmitting a single composite video (C-video) signal. The term Y/C video is sometimes used in place of super video. The use of super video signals in set-top box 150 is by way of example only. In alternate embodiments of the present invention, RF-to-super video converter 220 in set-top box 150A may be replaced by an RF-to-C-video converter that converters the incoming RF signals to composite video signals.

When VBI decoder 210 notifies advertisement controller 270 of the receipt of each swap signal and the corresponding channel, advertisement controller 270 compares the corresponding channel information for each swap signal to the viewer-selected channel currently being viewed. If the corresponding channel matches the viewer-selected channel, advertisement controller 270 determines that an original incoming commercial advertisement is about to begin on the viewer-selected channel being played on television set 105.

In response thereto, advertisement controller 270 determines which video advertisement to swap in and sends a signal to hard disk drive 250 that selects the particular replacement commercial advertisement from a plurality of replacement advertisements stored as video clips on hard disk drive 250. For the purposes of this application and the claims that follow, hard disk drive 250 is defined to include any mass storage device that is both readable and writable, including conventional magnetic disk drives and optical disk drives for read/write digital versatile disks (DVD-RW), re-writable CD-ROMs, and the like. In fact, hard disk drive 250 need not be fixed in the conventional sense that is permanently embedded in set-top box 150. Rather, hard disk drive 250 includes any mass storage device that is dedicated to set-top box 150 for the purpose of storing replacement advertisements. Thus, hard disk drive 250 may include an attached peripheral drive or removable disk drives (whether embedded or attached), such as a juke box device that holds read/write DVDs or re-writable CD-ROMS. Furthermore, in an advantageous embodiment of the present invention, hard disk drive 250 may include external mass storage devices that set-top box 150 may access and control via a network connection-(e.g., Internet protocol (IP) connection), including, for example, a disk drive in the user's home personal computer (PC) or a disk drive on a server at the user's Internet service provider (ISP).

Hard disk drive 250 then streams the selected replacement commercial advertisement to MPEG2 decoder/NTSC encoder 260, which converts the data from hard disk drive 250 to, for example, a super video signal suitable for transmission to television set 105. It should be noted that the choice of the MPEG-2 standard for the decoder portion of decoder/encoder 260 is by way of illustration only. In alternate embodiments of the present invention, the MPEG decoder may comply with one or more of the MPEG-1, MPEG-2, MPEG-4, and MPEG-7 standards. Advertisement controller 270 also sends a control signal to multiplexer 230 that switches the output of MPEG2 decoder/NTSC encoder 260 to television set 105 at the start of the original commercial advertisement in the viewer-selected channel.

The replacement commercial advertisements on hard disk drive 250 are stored there by MPEG2 encoder 240. MPEG2 encoder 240 downloads replacement commercial advertisements from the cable service provider and converts the downloaded ads to MPEG format for storage on hard disk drive 250. In an exemplary embodiment of the present invention, MPEG2 encoder downloads the replacement advertisements from one or more system-defined channels at one or more predetermined times. For example, MPEG2 encoder 240 may tune to a public access channel at 2 AM every Saturday night in order to download advertisements from the cable service provider for the following week. By modifying the download time(s) and the download channel(s), the cable service provider can customize the replacement advertisements stored in hard disk drive 250 to suit the tastes of individual subscribers. Modified download time(s) and modified download channel(s) may be downloaded directly to MPEG2 decoder 240 and stored in memory 280. Alternatively, modified download times and channels may be downloaded through advertisement controller 270 and then stored in memory 280.

Additionally, the cable service provider may further customize the replacement commercial advertisements by transmitting ad selection commands to advertising controller 270. The ad selection commands, which may accompany the swap signals, are used by advertisement controller 270 to select particular replacement commercial advertisements from the available advertisements stored on hard disk drive 250. In an advantageous embodiment of the present invention, MPEG2 encoder 240 may download a look-up swap table from the cable service provider each night. The look-up swap table identifies program times and channels that correspond to particular ad selection commands that may be transmitted to advertising controller 270. Thus, advertising controller 270 can receive a very simple command or data value that is used to locate a particular replacement advertisement entry in the look-up swap table.

Figure 3:
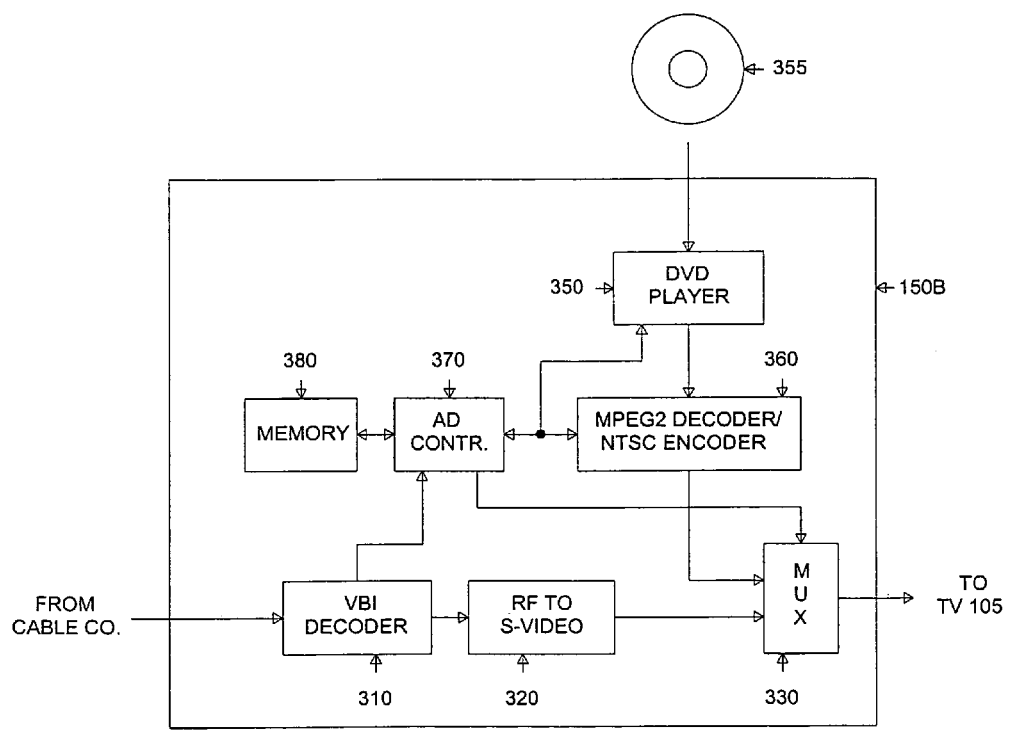
FIG. 3 illustrates in greater detail an exemplary set-top box according to another embodiment of the present invention.

FIG. 3 illustrates in greater detail exemplary set-top box 150B according to a second embodiment of the present invention. Set-top box 150B comprises vertical blanking interval (VBI) decoder 310, RF-to-super video (S-video) converter 320, multiplexer (MUX) 330, and digital versatile disk (DVD) 350. Set-top box 150B also comprises MPEG2 decoder/NTSC encoder 360, advertisement (AD) controller 370, and memory 380. For the most part, set-top box 150B operates in the same manner as set-top box 150A described above in FIG. 2. However, the replacement commercial advertisements are stored on DVD 355 and are played by DVD player 350. The MPEG files retrieved from DVD 355 by DVD player 350 are transmitted to MPEG2 decoder/NTSC encoder 360 and converted to a television signal suitable for transmission to television set 105. The cable service provider distributes the replacement commercial advertisements to subscribers by mailing DVD 355 to each subscriber on a periodic basis (weekly, bi-weekly, monthly, etc.)

Figure 4:
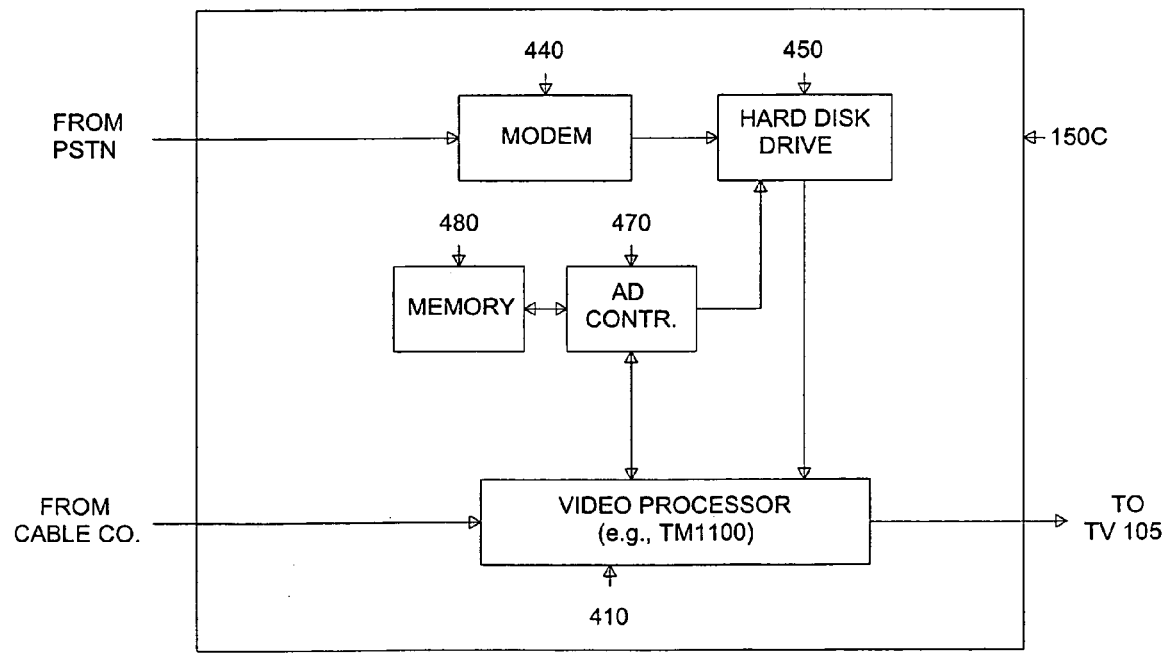
FIG. 4 illustrates in greater detail an exemplary set-top box according to still another embodiment of the present invention.

FIG. 4 illustrates in greater detail exemplary set-top box 150C according to a third embodiment of the present invention. Set-top box 150C comprises video processor 410, modem 440, hard disk drive 450, advertisement (AD) controller 470, and memory 480. For the most part, set-top box 150C operates in the same manner as set-top box 150A described above in FIG. 2. Video processor 410, which may be, for example, a TriMedia (TM) 1100 media processor, contains front-end circuitry similar to VBI decoder 210 and RF-to-super video converter 220 for receiving incoming television signals from the cable service provider, tuning to a user-selected channel, and converting the selected RF signal to a baseband television signal (e.g., super video signal) suitable for display on television set 105. Video processor 410 also contains MPEG decoder circuitry and NTSC encoding circuitry capable of converting the MPEG output from hard disk drive 450 to a baseband television signal suitable for display on television set 105.

In response to advertisement swapping commands received from advertisement controller 470, video processor 410 can switch from the incoming television signals from the cable service provider to the MPEG data streams coming from hard disk drive 450. Advertisement controller 470 receives the original swap signal transmitted by the cable service provider from the VBI decoder circuitry in video processor 410.

The replacement commercial advertisements on hard disk drive 450 are stored there by modem 440. Modem 440 downloads replacement commercial advertisements in MPEG format from the cable service provider via the public switched telephone network (PSTN). Modem 440 may load the replacement advertisements at one or more predetermined times or whenever the cable service provider dials modem 440.

Figure 5:
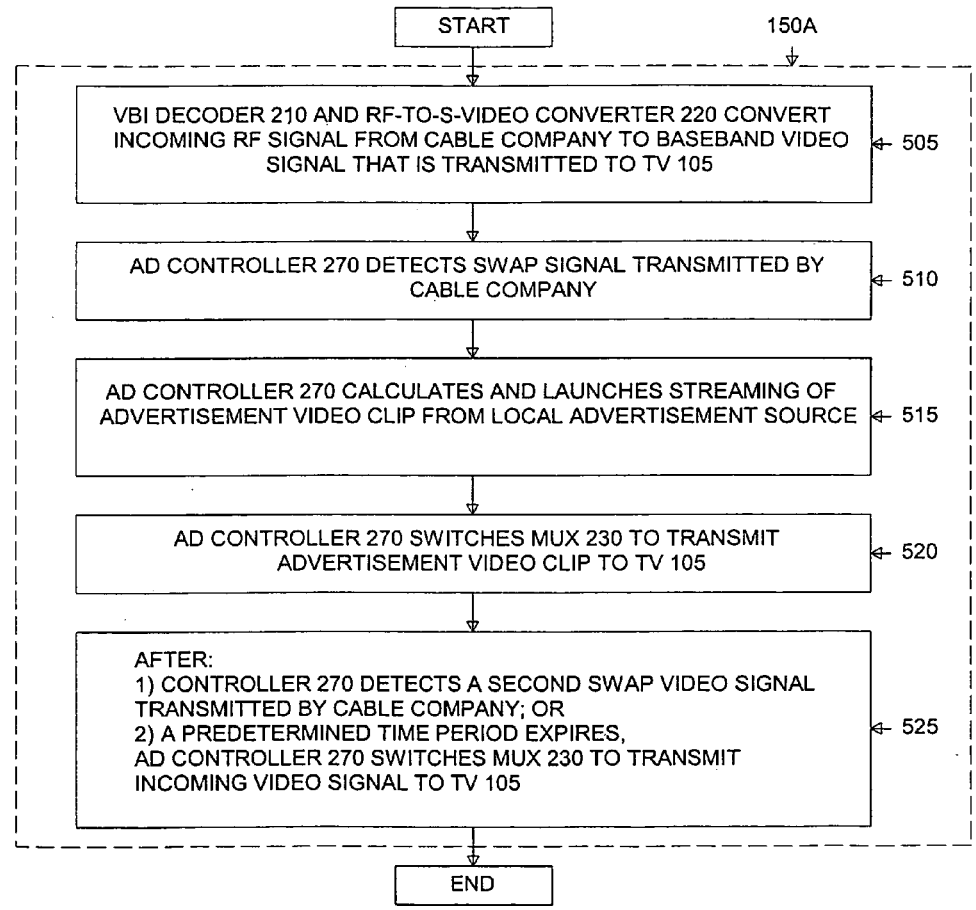
FIG. 5 is a flow diagram illustrating the operation of an exemplary set-top box according to one embodiment of the present invention.
Figure 5:

FIG. 5 depicts flow diagram 500, which illustrates the operation of exemplary set-top box 150A according to one embodiment of the present invention. Initially, VBI decoder 210 and RF-to-super video converter 220 convert an incoming RF signal selected by the viewer to a baseband video signal that is transmitted to television set 105 (process step 505). At some point, advertisement controller 270 detects a swap signal transmitted by the video company in the selected channel (process step 510). In response, advertisement controller 270 causes the local advertisement source, namely hard disk drive 250, to begin streaming an MPEG video clip to MPEG2 decoder/NSC encoder 260 (process step 515). Advertisement controller 270 also switches multiplexer 230 to receive the replacement advertisement video signal from MPEG2 decoder/NSC encoder 260 and transmit it to television set 105 (process step 520). Finally, advertisement 1E; controller 270 switches multiplexer 230 back to receive the incoming video stream from RF-to super video converter 220 and transmit it to television set 105. Advertisement controller 270 switches multiplexer 230 back after a predetermined timeout period (i.e., the commercial duration) or after detection of a second swap signal transmitted by the cable service provider (process step 525). Alternatively, advertisement controller 270 may cause the local advertisement source to begin streaming a second replacement advertisement to MPEG2 decoder/NSC encoder 260 when the second swap signal is received, thereby replacing a second original video advertisement in the incoming video stream.

As noted above, the principles of the present invention may readily be adopted for use with a radio (AM or FM) signal that is broadcast over the air in the conventional manner or is received from a local cable service provider. Many cable systems deliver radio broadcasts over televisions channels that display a test pattern or public information bulletin board on the television screen. However, STB 150 may also work in conjunction with, or be incorporated into, a radio receiver. In such an embodiment, the television receiver circuitry (e.g., VBI decoder 210 and RF-to-super video converter 220) is replaced by radio receiver front-end circuitry (e.g., low noise amplifier, tuner, and demodulation circuitry) and hard disk drive 250 stores audio data files that comprise replacement audio advertisements. The replacement advertisements are then transmitted to the audio speakers of the attached radio receiver in place of the original incoming radio signal.

Although the present invention has been described in detail, those skilled in the art should understand that they can make various changes, substitutions and alterations herein without departing from the spirit and scope of the invention in its broadest form.

What is claimed is:

1. An addressable advertising system comprising:
receiver circuitry capable of receiving an incoming television signal from an external source, generating therefrom a original baseband video signal, and transmitting said original baseband video signal to a display associated with said addressable advertising system;
a local storage device coupled to said receiver circuitry capable of storing a plurality of replacement video advertisements; and
an advertisement controller coupled to said receiver circuitry and said local storage device capable of detecting a first swap control signal and associated channel identifier transmitted in said incoming television signal, wherein said advertisement controller, in response to said detection and said channel identifier, causes said receiver circuitry to receive from said local storage device a first selected replacement video advertisement and wherein said receiver circuitry generates therefrom a replacement baseband video signal and transmits said replacement baseband video signal to said display.

2. The addressable advertising system as set forth in claim 1 wherein said local storage device comprises at least one of a magnetic fixed disk drive, a digital versatile disk (DVD) drive, and a compact disk (CD) drive.

3. The addressable advertising system as set forth in claim 1 wherein said local storage device is coupled to said addressable advertising system via a network connection.

4. The addressable advertising system as set forth in claim 1 further comprising a replacement advertisement download controller capable of receiving incoming replacement video advertisements from said external source and storing said incoming replacement video advertisements in said local storage device.

5. The addressable advertising system as set forth in claim 4 wherein said replacement advertisement download controller comprises an MPEG encoder circuit capable of receiving said incoming television signal and converting a first incoming replacement video advertisement transmitted in a first selected channel to MPEG data capable of being stored in said local storage device.

6. The addressable advertising system as set forth in claim 4 wherein said replacement advertisement download controller comprises a modem capable of receiving from a telephone network a first incoming replacement video advertisement and storing said first incoming replacement video advertisement as MPEG data in said local storage device.

7. The addressable advertising system as set forth in claim 4 wherein said replacement advertisement download controller receives said incoming replacement video advertisements at a predetermined time according to modifiable download time values stored in a memory associated with said advertisement controller.

8. The addressable advertising system as set forth in claim 1 wherein said advertisement controller is further capable of detecting a second swap control signal transmitted in said incoming television signal, wherein said advertisement controller, in response to said detection of said second swap signal, causes said receiver circuitry to transmit said original baseband video signal to said display.

9. The addressable advertising system as set forth in claim 1 wherein said advertisement controller is further capable of detecting a replacement advertisement selection signal transmitted in said incoming television signal, wherein said replacement advertisement selection signal comprises a data value identifying said first selected replacement video advertisement, and wherein said advertisement controller, in response to said detection of said replacement advertisement selection signal, causes said local storage device to transmit said first selected replacement video advertisement to said receiver circuitry.

10. The addressable advertising system as set forth in claim 1 wherein said receiver circuitry comprises a vertical blanking interval (VBI) decoder capable of detecting said first swap control signal transmitted during a vertical blanking interval in said incoming television signal.

11. The addressable advertising system as set forth in claim 10 wherein said receiver circuitry further comprises a down-converter coupled to said vertical blanking interval decoder and capable of down-converting said incoming television signal to said original baseband video signal.

12. The addressable advertising system as set forth in claim 11 wherein said receiver circuitry further comprises a multiplexer having a first input capable of receiving said original baseband video signal and a second input capable of receiving said replacement baseband video signal, wherein said multiplexer is controlled by said advertisement controller.

13. The addressable advertising system as set forth in claim 1 wherein said receiver circuitry comprises a video processor having a first input capable of receiving said incoming television signal and generating therefrom said original baseband video signal and a second input capable of receiving said first selected replacement video advertisement and generating therefrom said replacement baseband video signal.

14. For use in an addressable advertising system, a method of displaying user-specific commercial advertisements on a display associated with the addressable advertising system, the method comprising the steps of:
    receiving an incoming television signal from an external source and generating therefrom an original baseband video signal;
    transmitting the original baseband video signal to the display;
    detecting a first swap control signal and associated channel identifier transmitted in the incoming television signal;
    in response to the detection of the first swap control signal and channel identifier, receiving from a local storage device a first selected replacement video advertisement, generating therefrom a replacement baseband video signal, and transmitting the replacement baseband video signal to the display.

15. The method as set forth in claim 14 wherein the local storage device comprises at least one of a magnetic fixed disk drive, a digital versatile disk (DVD) drive, and a compact disk (CD) drive.

16. The method as set forth in claim 14 wherein the local storage device is coupled to the addressable advertising system via a network connection.

17. The method as set forth in claim 14 further comprising the steps of:
    receiving incoming replacement video advertisements from the external source; and
    storing the incoming replacement video advertisements in the local storage device.

18. The method as set forth in claim 17 wherein the step of receiving incoming replacement video advertisements comprises the sub-step of converting a first incoming replacement video advertisement transmitted in a first selected channel of the incoming television signal to MPEG data and the step of storing the incoming replacement video advertisements comprises the sub-step of storing the MPEG data in the local storage device.

19. The method as set forth in claim 17 wherein the step of receiving incoming replacement video advertisements comprises the sub-steps of receiving from a telephone network a first incoming replacement video advertisement and the step of storing the incoming replacement video advertisements comprises the sub-step of storing the first incoming replacement video advertisement as MPEG data in the local storage device.

20. The method as set forth in claim 14 comprising the further steps of detecting a second swap control signal transmitted in the incoming television signal and, in response to the detection of the second swap signal, transmitting the original baseband video signal to the display.

21. The method as set forth in claim 14 comprising the further steps of detecting a replacement advertisement selection signal transmitted in the incoming television signal, wherein the replacement advertisement selection signal comprises a data value identifying the first selected replacement video advertisement, and, in response to the detection of the replacement advertisement selection signal, transmitting the first selected replacement video advertisement from the local storage device to the receiver circuitry.

22. The method as set forth in claim 14 wherein the step of detecting the first swap control signal comprises the sub-step of detecting the first swap control signal during a vertical blanking interval in the incoming television signal.

\* \* \* \* \*